United States Patent
Fay et al.

(10) Patent No.: US 9,277,360 B2
(45) Date of Patent: Mar. 1, 2016

(54) SITUATION SENSITIVE INFORMATION PUSH

(71) Applicant: SONY CORPORATION, Tokyo (JP)

(72) Inventors: Luke Fay, San Diego, CA (US);
Frederick Zustak, Poway, CA (US)

(73) Assignee: Sony Corporation, Tokyo (JP)

(*) Notice: Subject to any disclaimer, the term of this patent is extended or adjusted under 35 U.S.C. 154(b) by 52 days.

(21) Appl. No.: 14/148,222

(22) Filed: Jan. 6, 2014

(65) Prior Publication Data
US 2015/0195678 A1 Jul. 9, 2015

(51) Int. Cl.
*H04W 40/02* (2009.01)
*G06Q 30/02* (2012.01)
*H04W 4/02* (2009.01)

(52) U.S. Cl.
CPC ........... *H04W 4/025* (2013.01); *G06Q 30/0261* (2013.01)

(58) Field of Classification Search
CPC .. H04W 4/02; H04W 64/00; H04L 29/08657; H04L 67/18
See application file for complete search history.

(56) References Cited

U.S. PATENT DOCUMENTS

| | | | |
|---|---|---|---|
| 2003/0208409 A1* | 11/2003 | Mault | G06F 19/3475 705/15 |
| 2005/0043037 A1* | 2/2005 | Ioppe et al. | 455/456.1 |
| 2007/0237318 A1 | 10/2007 | McGary | |
| 2008/0034035 A1* | 2/2008 | Dodrill | H04M 1/72561 709/203 |
| 2010/0077017 A1 | 3/2010 | Martinez et al. | |
| 2012/0100866 A1* | 4/2012 | Grossman et al. | 455/456.1 |
| 2013/0073389 A1 | 3/2013 | Heath | |
| 2013/0138741 A1* | 5/2013 | Redstone et al. | 709/204 |
| 2014/0172192 A1* | 6/2014 | Kato | 701/2 |

OTHER PUBLICATIONS

"Considerations for Creating Streamed Video Content Over 3G-324M Mobile Networks," Dialogics, 2009.
Griffin, "A Rule-Based Inference Engine which is Optimal and VLSI Implemental," Department of Computer Sciences, University of Kentucky, 1989.

* cited by examiner

*Primary Examiner* — Kashif Siddiqui
*Assistant Examiner* — Minjung Kim
(74) *Attorney, Agent, or Firm* — John L. Rogitz (57) ABSTRACT

A method involves an MNO receiving data from a mobile device representing a current situation of a user of the device. The MNO stores data characterizing products and services represented in a solution knowledgebase. The MNO stores data characterizing the user in a user knowledgebase. An inference engine analyzes the data in order to determine if the data corresponds to an actionable event relevant to the user. If so, a search of information relevant to the event and the mobile device data at least in the solution knowledgebase is conducted and the results are pushed to the mobile device. This abstract is not to be considered limiting, since other embodiments may deviate from the features described in this abstract.

15 Claims, 4 Drawing Sheets

SITUATION SENSITIVE INFORMATION PUSH

COPYRIGHT AND TRADEMARK NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever. Trademarks are the property of their respective owners.

BACKGROUND

Each generation of portable devices such as smartphones are becoming more and more highly intelligent devices that have access to large quantities of information via the Internet and other sources via its associated mobile network operator (MNO). However, this intelligence has not been significantly exploited to provide information useful to the situational experiences of the user that can be deduced from these various sources of information.

BRIEF DESCRIPTION OF THE DRAWINGS

Certain illustrative embodiments illustrating organization and method of operation, together with objects and advantages may be best understood by reference to the detailed description that follows taken in conjunction with the accompanying drawings in which:

FIG. 2, which is made up of FIG. 2A and FIG. 2B, is an example of a flow chart depicting a portion of a process consistent with certain embodiments of the present invention.

DETAILED DESCRIPTION

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a function, a procedure, an object method, an object implementation, in an executable application, an applet, a servlet, a source code, an object code, a script, a program module, a shared library/dynamic load library and/or other sequence of instructions designed for execution on a computer system.

The term "program", as used herein, may also be used in a second context (the above definition being for the first context). In the second context, the term is used in the sense of a "television program". In this context, the term is used to mean any coherent sequence of audio video content such as those which would be interpreted as and reported in an electronic program guide (EPG) as a single television program, without regard for whether the content is a movie, sporting event, segment of a multi-part series, news broadcast, etc. In this discussion, the use of the term "Program" is generally consistent with that of the MPEG-2 Systems standard (ISO/IEC 13818-1). An MPEG-2 Program has the associated Elementary Stream components, such as for example one video Elementary Stream and one or more audio Elementary Streams. This term is further consistent with the definition and explanation provided in "PSIP—Program and System Information Protocol" by Mark Eyer, The McGraw-Hill Companies, Inc., 2003. The term may also be interpreted to encompass commercial spots and other program-like content which may not be reported as a program in an electronic program guide.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

This discussion relates to providing situation sensitive information to a mobile device user based on "collateral input" that can be used to deduce a user's current situation and react to it. A location of the mobile device is determined along with other external collateral data and meta-data, for example user profiles, viewed content history, social media information, to target information to the user for a more useful and effective mobile user experience. Temporal information outside of or within streamed content may also be used for effective targeting of information to a mobile user.

In accord with the present teachings, mobile device receivers receive situation sensitive information based upon its known GPS location, viewed content, user profile, history of web browsing, etc. to enable a richer mobile experience.

In addition, information including advertisements can be made less annoying for the user by being more relevant and informative to the user's situational information. A user is more likely to have a positive response to information if it is currently relevant to the situation the user is in.

Figure 1:
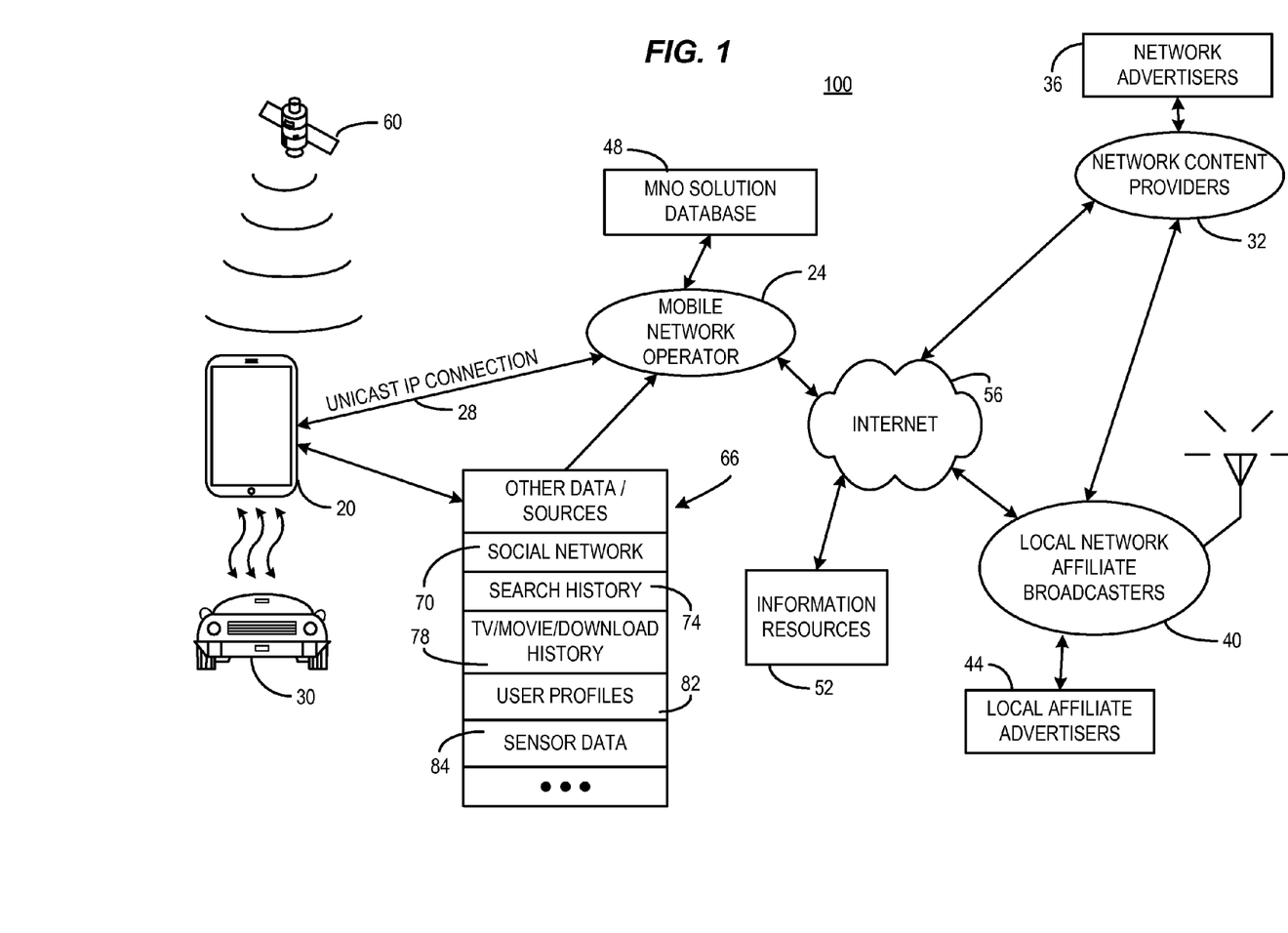
FIG. 1 is an example system diagram consistent with certain embodiments of the present invention.

Turning now to FIG. 1, a system block diagram 100 is provided in which a mobile device such as a smartphone 20 receives telephone and data service from mobile network operator site 24. Data services may be provided in a one-to-one fashion via unicast Internet Protocol connection 28. When the phone is within a vehicle such as automobile 30, the phone 20 may be configured to communicate with the vehicular electronics via Bluetooth™ communication (i.e., by pairing) or other wired or wireless communication medium.

The vehicular electronics may provide for electronic monitoring of engine functions, tire pressure, speed of travel, traffic alerts, fuel level, oil pressure, coolant pressures, battery charge condition, warning lights, engine diagnostics, status of lights, wipers and other accessories, and numerous other vehicular operational parameters. By virtue of pairing the phone 20 with the automobile (e.g., via a Bluetooth pairing), the phone 20 can be advised of informational parameters that relate to the user's current situation.

In a traditional broadcast television setting, TV programming, information and advertisements are broadcast in a one-to-many arrangement that is ineffective at addressing individual interested users. For example, network content providers 32 (broadcasters) such as NBC, CBS, FOX, ABC, etc. provide content and network advertisements from network advertisers 36 to local network affiliates 40. Local network affiliates 40 also provide local content (e.g., news, weather, traffic, bulletins, Amber Alerts, public safety information, etc.) as well as advertisements that are locally sold and produced from local affiliate advertisers 44. Since this information is simply broadcast as desired by the local affiliate (subject to various regulations), the content may be situationally irrelevant to a mobile device user, even though such devices are more and more commonly able to receive real time broadcasts of entertainment content and the like.

But, in a mobile device environment there is the ability for a mobile device 20 to communicate via the unicast Internet protocol (IP) connection 28 with the Mobile Network Operator (MNO) 24. MNOs are mobile service providers such as Sprint, AT&T, Verizon, etc. which provide contact with mobile devices for telephone, short message service (SMS), and Internet connectivity (e.g., 3G or 4G). MNOs are not generally in the business of accumulating and pushing information related to a user's situational state, but with the capabilities disclosed herein, may choose to accumulate information relating to local resources including hospitals, parks, government offices, organizations, traffic, businesses, etc. referenced herein as MNO solution database 48. The MNO also has the ability to obtain data from various information resources 52 via the Internet 56 using search technology. Further, the MNO may store in the solution database 48 electronic incentives and other information that may be useful to the user and may further be a vehicle for the MNO to obtain revenue from the source of the incentives.

Currently many mobile phones and other portable devices such as 20 also have clocks and Global Positioning System (GPS) technology embedded within them in order to receive and compute time, speed and location information from an array of GPS satellites represented by 60. Additionally, such devices 20 may incorporate or be in communication with other devices that provide information regarding a particular user's current state or situation. Examples include pulse rate and other health related monitoring systems and sensors. The GPS data can be used by the mobile device user for navigation as well as many other functions. Together with any other source of collateral data, reasonable deductions can be made as to the particular needs of an individual under a particular set of circumstances. Moreover, this location information as well as other collateral information can be sent to the MNO for use by the MNO to ascertain situationally relevant context for the user's current experience and push content to the user that may be of interest or use to the user based upon the user's current situation as deduced by the MNO.

The MNO can derive other information that is relevant to the particular user from a number of sources such as information sources 52 via the Internet 56, MNO solution database 48, and other data and data sources represented by 66 including, but not limited to, social network activity 70, Internet search history 74, content downloads such as TV shows, movies etc. 78, user profiles 82 and sensor data 84. Information can be specific or more generic in nature such as, restaurants, popular restaurants or user favorite restaurants. Additional information that may be useful to a situational analysis engine can include travel history deduced from the user's mobile device GPS data, anti-sleep alarms, emergency flasher status, weather conditions, purchase history from an electronic wallet in the device 20, account balances, date, time, proximity to friends or places of business (as deduced from device-to-device communication and GPS data, and other information. Sensor data 84 relating to vehicle 30 or directly to the user or the user's health or environment can be received by the phone 20 and forwarded to the MNO 24 by phone 20. Other relevant information can include time, personal data, proximity of user to various locations or people or businesses, weather, etc.

Figure 2A:
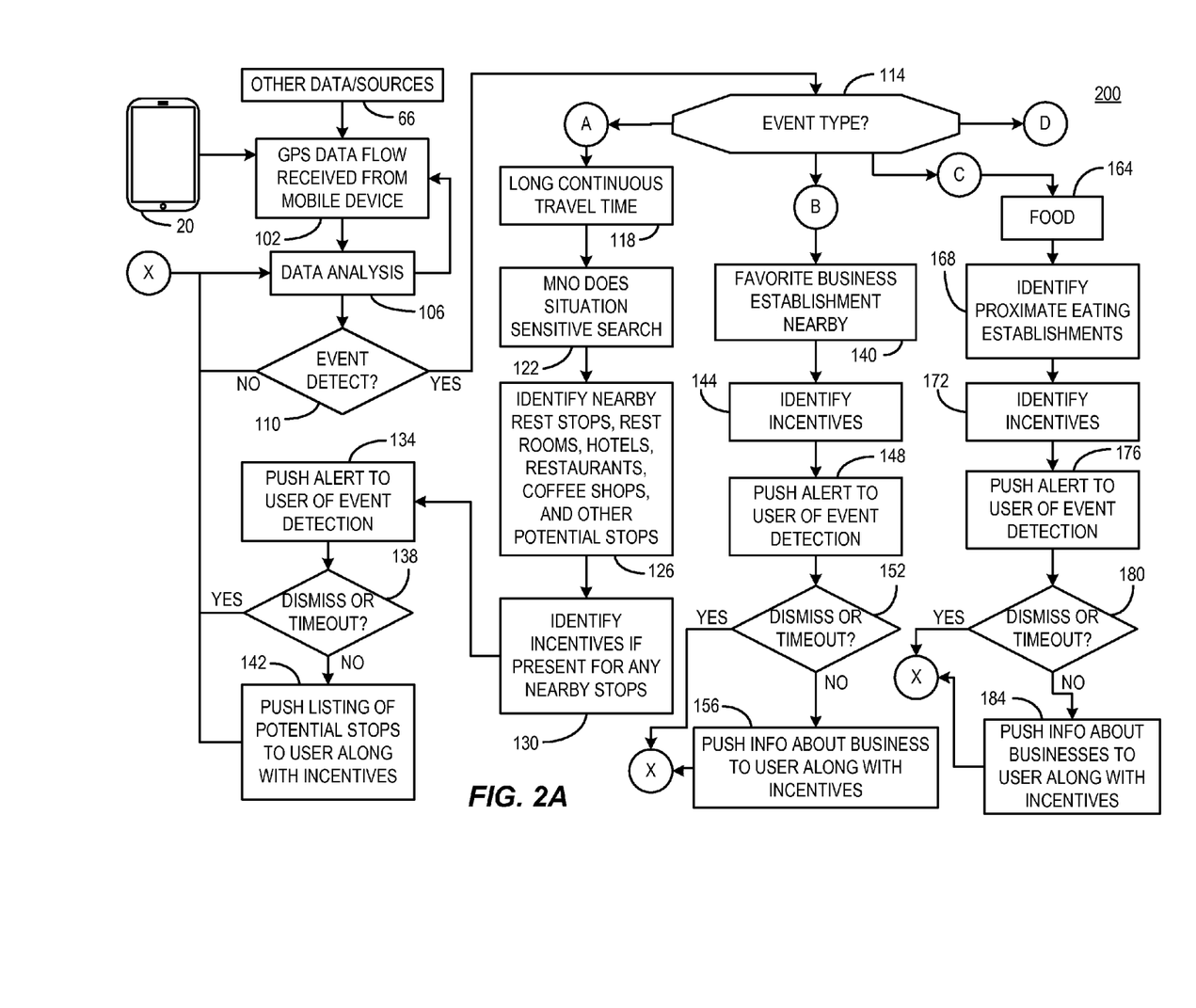
Figure 2B:
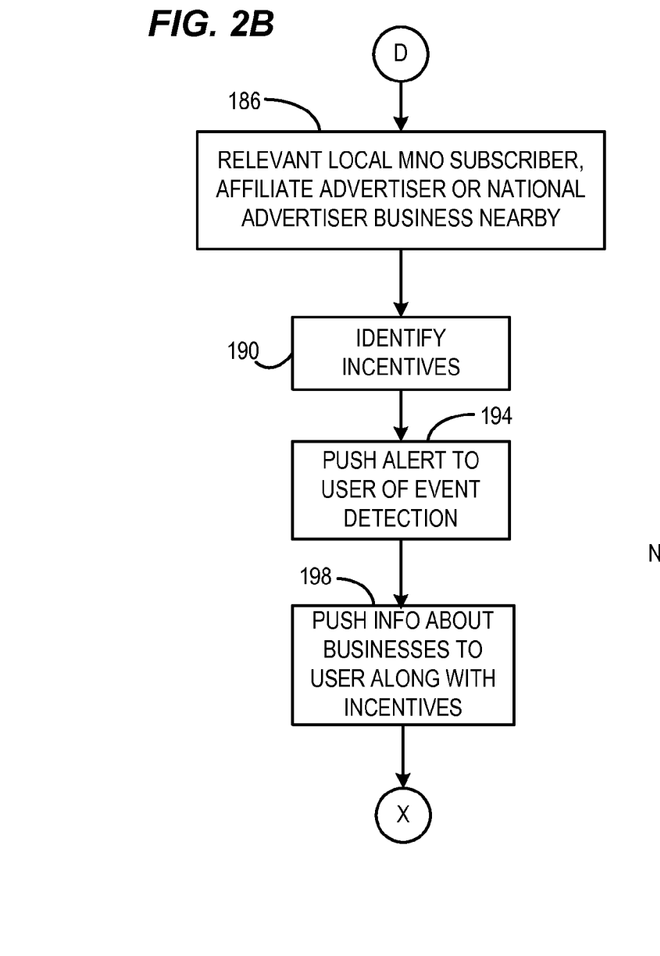

In order to understand operation of a system as taught hereby, consider the following illustrative example as depicted in flow chart 100 of FIG. 2 including FIG. 2A and FIG. 2B. For purposes of the examples provided herein, data from vehicle electronics systems 30, sensors and other users can be considered other data/sources 66 for ease of illustration. In a simple illustrative example, a user's GPS information can be sent from the device 20 to the MNO at 102 and monitored by the MNO to let the MNO know a user's current location. By monitoring a stream of updates of such information, a predictive engine such as an inference engine situated at and controlled by the MNO (or elsewhere including at the device 20) can conduct an analysis for situational awareness to determine if a user has been continuously traveling for the last several hours at a rate of speed indicating confinement within a vehicle without a stop. This information along with other data from data/sources 66 are analyzed at 106 by the inference engine to determine that certain prescribed events have occurred.

When analysis of the current situational information indicates at 106 that an actionable event is detected at 110 (e.g., by application of production rules in the MNO's inference engine), the MNO can determine at 114 that the type of event is long travel time at 118. The MNO can then gather information from various data sources by doing a search to identify items that may be relevant to the current situation at 122. For this event, it can be deduced that the user may be tired, hungry or sleepy. Hence, the search can seek to identify nearby rest stops, rest rooms, hotels, restaurants, coffee shops, shopping malls, favorite chain establishments, fuel stations, and other potential stopping places at 126 that may be of interest to the user (e.g., if the user is in an automobile, those points of interest in the vicinity may be, for example, within five miles—in other instances, those points of interest may be within ¼ to ½ mile, as an illustrative example). These results can be generalized or specific. In addition to identification of this type of information, such information can be correlated at 130 to local merchant promotions that may provide incentives to the user for any nearby potential stops. Such incentives may be provided by MNO local business subscribers or online offers or other sources in the form of electronic coupons or enhanced services and the like.

This information as gathered at 122, 126 and 130 that is deduced to relate to the user's situation can then be pushed to the user in an orderly and easily used manner. For example, the user can first be alerted to a situational even by an alert in the form of an alert tone, voice or other alert at 134 to inform the user that the inference engine has detected a situationally relevant event. In this example, an audible alert may be sounded in the form of a beep or ring tone or the like followed by an audible synthesized voice that explains the alert. For example, the audible voice could say "You appear to have been driving for over three hours without a break. Would you like to hear about local options for taking a break?" Other alerts such as visual or vibratory alerts may also be used. The user can then respond by voice command or otherwise at 138. If the user responds "no" or if no response is received after a reasonable time (e.g., 15 seconds) at 138, the process ends here and control goes back to data analysis at 106 to process the next event as it is detected. In this example, a similar alert may occur in an additional hour, for example, and the data analysis may be substantially continuous as opposed to arranged in the specific order depicted.

However, if the user responds "yes", the MNO pushes a listing to the device 20 at 142 to provide a resource for the user to be alerted to the presence of nearby restrooms, hotels, restaurants, etc. which offer the services needed, food they like, incentives that can be used or the like. This can be done in multiple stages in which broad categories of products/services can be narrowed by any convenient hierarchical or non-hierarchical mechanism at 142 to permit the user to more readily access the product/service desired. Hence, to further this example, the user may be provided with audible and visual information about local options applicable to the situation. In the case of a user that may be driving, a voice menu can be provided to categorize the type of potential stops such as "Please tell me if you need: food, rest, fuel, rest room, or other". Based on the user's response, audible and/or visual suggestions can be made. Speech analysis can be used to allow the user to drill down the search to specifics such as "rest room and gas". The MNO can then reply with options for the user such as "two closest options: 1—gas station in one mile at exit 14 on the right, 2—gas station in two miles at exit 15 on the right offers free coffee incentive". If the user stops at the second gas station (option 2) the incentive (e.g., in the form of an electronic code or coupon) will be made available on the device 20 for use at the gas station if the user wishes to take advantage of the incentive when he stops.

In this example, the two gas stations are presumed to be the two closest, but in other examples, other data sources such as user profiles, purchase history or history of prior locations of stops or transactions may indicate that the user only uses a particular brand of gasoline or prefers a particular brand of gasoline, has a particular preferred credit card or debit card that is accepted, etc. Hence, the data analysis can further refine recommendations to constrain the suggestions to only a particular brand of fuel or to prioritize that brand of fuel or form of payment in the search for nearby fuel stops. In certain embodiments, the proximity and brand can be weighting functions in a decision algorithm so that close stops may be favored over a particular brand if the brand is a much longer distance away. This decision can be further enhanced by knowledge of the amount of fuel left in the tank or other data provided by automobile 30.

In other embodiments, a recommendation can be required to provide at least one instance of the closest stop with the preferred brand even if it is substantially further away. In other embodiments, a recommendation will include MNO solution database businesses that are particularly relevant to the event will be included in the list as long as the user is within the business's service area. Many other variations will occur to those skilled in the art upon consideration of the present teachings.

Referring back to FIG. 2, consider a further example situation in which a user has a history, as can be ascertained by analysis of GPS location history, of visiting a particular type of retail business such as sporting goods stores. The user may also have a search history of looking for fishing and hunting supplies on the Internet. As the user is traveling in his automobile, analysis of the GPS data and correlation with MNO solution database 48 at 106 indicates that the user is in near proximity to a sporting goods store at 110 as a determined event type 140 at 114. Such a sporting goods retailer may be a favorite chain, or local business whose profile with the MNO provides information matching or correlating well by inference with the user's profile. In this case, the "user's profile" may explicitly cite sporting goods, fishing and/or hunting as a "like", or that information can be inferred from search history, GPS history, online subscriptions, spending patterns, etc. In any case, once the event has been categorized the MNO can determine if incentives are available to the user at 144 and push an alert of the event to the user (i.e., user is near a business establishment of interest) at 148. The user can dismiss, or ignore the alert or can accept the alert at 152 and receive information including GPS coordinates or directions to the business establishment along with any identified incentives at 156. The process then awaits the next relevant event.

As a further simple example, the data analysis at 106 can identify that it is the user's normal lunch time which categorized as a food event at 114. This can be known from the user's profile, medical history (e.g., diabetes) spending habits, or assumed to be a particular time (e.g., noon for lunch). The location of the user can be ascertained from time and from GPS data and the MNO can identify proximate eating establishments at 168. Such establishments can be selected or categorized as known user favorites from the user profile, spending habits, history of location of the user at lunch time, etc. The proximate eating establishments can be mined from the MSO's solution database 48 as well as from local affiliate and network advertisers 44 and 36 respectively which are within a reasonable proximity of the user.

Additionally, social network data may indicate that the user is near an eating establishment from which a friend is posting to the social network, or that a friend is nearby and posting to the social network. By the MNO bringing this situation to the attention of the user, the user may wish to contact the friend with a suggestion to meet for lunch.

Further, if the user has a search history (or profile data), for example, of searching for vegan food restaurants or any other particular type of restaurant, the inference engine can seek out those types of businesses as suggestions for the user.

If sensor data indicates that a diabetic user's blood sugar is low, the inference engine can prioritize based on closest proximity and/or diabetic friendly businesses and can alert the user of the need to expedite getting food.

Once candidate eating establishments are identified at 168, the MNO can determine if there are available incentives which may save the user money at 172 and an alert can be pushed to the user notifying him that it is his normal eating time. Again the user can accept the alert or dismiss or ignore the alert at 180 and if accepted, the MNO can push the information at 184 to the user regarding the local eating establishments as well as any available incentives.

In the above examples thus far of FIG. 2, the user is given the option of ignoring alerts and accepting the information from the MNO regarding the relevant event. However, in other implementations, the alert can be accompanied by or constitute the information without the user having to take any action to accept the pushed information. The user can, of course, ignore the information being pushed by the MNO if he desires, but in this case the information is pushed without a user decision (such as at 138, 152 and 180). This variation is depicted in the event associated with FIG. 2B.

In this situation, presume that the user has been looking for a new automobile and has an Internet history of searching for a Ford brand truck. As the user travels and enters the proximity of a Ford dealer, this event is detected by data analysis at 106 and event detection 110. The event type is characterized at 114 as an event of interest in at a local dealer in the MNO's solution database, local affiliate advertiser or network advertiser business is nearby at 186. The MNO then searches for any incentives that may be advantageous to the user's situation or advantageous to the user or an advertiser at 190 and then pushes an alert to the user at 194 along with pushing the information about the businesses and any available identified incentives to the user at 198.

The above are but four simple examples of various events that can be identified by a situationally aware engine based on the user's current situation. In this case the phone 20 uses the inference engine (e.g., situated at the MNO or elsewhere via a mobile app, for example) to provide an enhanced situationally sensitive experience for the user and which can provide the MNO with the ability to receive revenue (by charging for inputs to the MNO solution database or use of the engine) from business subscribers that offer incentives or otherwise pay for consideration by the MNO and pass through revenue from other entities such as the local affiliates and networks or other content sources. In other embodiments, the MNO can receive revenue from users for subscription to the services described above on a monthly or per accepted alert basis, for example. In other implementations, the unicast IP connection 28 can be used by the phone 20 to operate its own inference engine or other situationally aware engine to access the database 48 and other sources 52 and 66 to carry out a similar process that operates on mobile device 20 to identify a situational event and retrieve relevant data and information for consumption by the user.

Since most mobile phones and other mobile devices are 3G or 4G LTE (or other standard) data enabled, unicast (point to point) communication can be used for communication between the MNO and the user's device. This technology allows the user's device to send collateral information such as location, search history, travel history, profile, electronic wallet data, social network data, time, travel speed, travel direction, schedule, etc. back to the MNO which is connected to local affiliates, broadcasters and other content providers (e.g., Netflix, Hulu, Sony Entertainment Networks, etc.). These providers can tailor their offerings to the user's particular situation. Such situation may be based on location, time, profiles and perceived needs derived from search histories and common visits. Thus, for an audience that can be situationally receptive, more relevant information can be provided. Moreover the user experience is enhanced by being made aware of resources, businesses and incentives that are relevant to the user's immediate situation without need for the user to take a specific action.

There is also other collateral information that can be made available to the inference engine of the MNO, for example various entertainment content providers already capture user profiles which contain billing addresses. This can be used to build and enhance a collective history of category of shows/games which the user likes to rent/buy from the network. This could enable more relevant data to be pushed to the user based upon the user's situation. For example, if the data from such sources indicates that a user frequently enjoys comedy TV programs and movies, a nearby comedy club or the local comedy hour television or radio program may be of interest and can be pushed to that user if accepted. This may be particularly appropriate when the user is far from home in a hotel or the like. So, not only does the user's current location factor into the analysis by the inference engine, but local businesses can be matched with users based on the user's billing address and the type of content viewed.

Currently content providers have the ability to send meta-data along with content to better render the service on receivers. This meta-data can also be used for providing additional situationally relevant information as well. For example, repeatedly accessed meta-data on a certain football player (e.g., statistics) could signal a broadcasters or content providers to curtail advertisements related to the NFL to that user so as not to annoy the user. Since the user's activity suggests that the user is already a football fan, the MNO could instead push data that assures that the user is provided with scheduling information that may be more relevant to the user's needs as opposed to trying to attract the user to programming that he is already likely to be attracted to. But, such browsing history may suggest that the user has other related interests that can be pushed to the user (e.g., sporting goods or team logo clothing).

However, meta-data within content does not necessarily have to be passed on (distributed) by the Mobile Network Operator (MNO), so this external collateral information could be used instead to pass relevant data to users. In the previous example, if a given television network is the provider of NFL football games, the user might have an account with the network to receive all NFL games. Here, data relating to his favorite team (favorite team being based on history of streamed content, browsing, etc.) allows that user to be more in tune with the product offering and more likely to consume products and be informed in a positive way.

External collateral information can be accumulated by the MNO in a variety of ways such as GPS location, user profiles, viewed content history, browser favorites, sensor data, and social media interaction and connections. Some content providers may run their own website portal which can collect social media information that can be accessed by the MNO. Voting statistics for certain musicians on talent shows, or the very act of voting, can trigger information regarding guitars by a particular manufacturer or which are available at the local music shop. This interactive service knowledge allows users to be more connected to their mobile devices and be informed by the mobile devices of things that are of interest to the user, thus rendering the mobile device more relevant to user.

In addition to the above information sources, temporal information within content can also be used as a resource. For example at 1 hour and 34 minutes into a movie a new car is shown and if the user comments on social media that the car is liked, or if the user begins searching for information relating to that car, the information could be used to pass on data such as local car dealers that may stock the automobile of interest to the user. In this case, the immediate addition of new cars from a social media 'like' tag is the immediate temporal interactive usage customers might like.

The above examples of types of events are intended to merely illustrative of the many event types that can be handled in a similar manner using embodiments consistent with the present teachings. Other variations will occur to those skilled in the art upon consideration of the present teachings.

Figure 3:
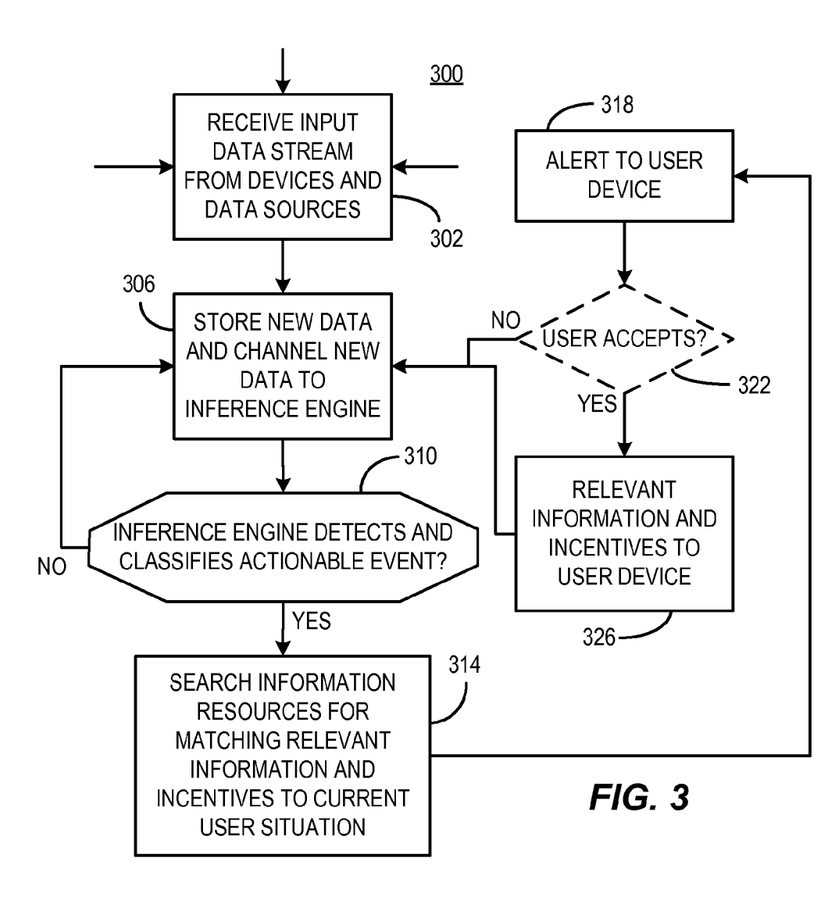
FIG. 3 is a more generalized example flow chart depicting a method consistent with certain embodiments of the present invention.

Referring now to FIG. 3, a more generalized method consistent with an example implementation consistent with the present teachings is depicted as flow chart 300. In this example, data are received from multiple sources at 302 that relate to the user's current situation and/or related information about the user's habits, preferences, likes, dislikes, interests, behavior patterns, etc. as previously described. This data are stored at 306 and channeled to a situational analysis engine such as the illustrative MNO's inference engine which is continually examining information for the occurrence of an actionable event at 310. It is noted that the situational analysis engine as the illustrative inference engine is in general location independent.

Inference engines operate in several different ways, but one of the more readily understood operations uses production rules that are applied to data from a knowledgebase. When the rule is satisfied, a defined action or set of actions is carried out. These rules can be thought of as expressions that carry out an "if <conditions> then <actions>" operation, where if the conditions are true then the actions are executed. In making inferences, the inference engine can utilize forward and backward chaining. Other techniques used in artificial intelligence can also be brought to bear on drawing the inferences in a manner consistent with the present teachings as will be appreciated by those skilled in the art upon consideration of the present teachings. Using the "if <conditions> then <actions>" model, one can see, for example that the operation of the example of FIG. 2 shown as "food" 164 can be characterized (in pseudocode) as:

```
If time equals lunch time, then:
    Get user's current location;
    Search for proximate places to eat in MNO business subscriber
knowledge base, user history, user preferences, etc. to produce results;
        Search results for incentives;
        Push alert to user;
        (If accepted) Push search results, incentives and related data (e.g.,
locations) to user;
    Return.
```

Other inference techniques can be used in addition or instead of the production rules as illustrated, but it is useful to identify this technique as one illustrative but non-limiting example of implementation of a situationally sensitive engine suitable for use in conjunction with the present teachings.

When an actionable event is identified at 310 the inference engine continues to look for additional events, but this event is characterized and control on this event is passed to 314 where one or more databases are searched, possibly as well as other resources such as local affiliate advertisers, network advertisers, Internet resources, and other useful resources to identify information relevant to the user's currently deduced situation. Additionally, the search can seek incentives that may be useful to the user such as coupons or sales. The MNO then pushes an alert to the user device at 318 and depending on the implementation, the user can accept or decline further information (or not) at optional block 322 after which accepted (or by default) the relevant information and incentives are pushed to or retrieved for the user at 326. Many variations will occur to those skilled in the art upon consideration of the present teachings.

Figure 4:
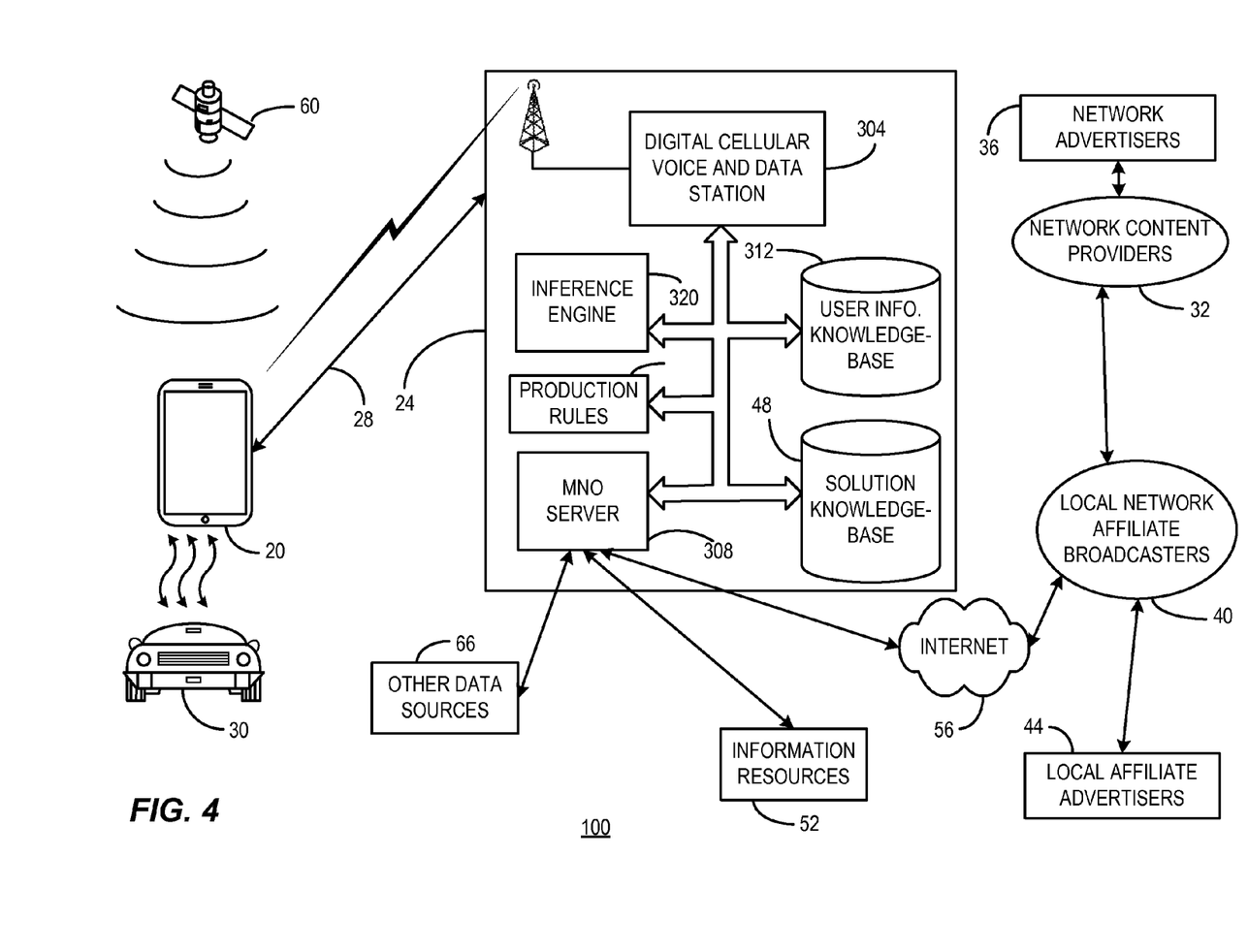
FIG. 4 is an example of a system diagram showing greater detail in the MNO in a manner consistent with certain embodiments of the present invention.

Referring now to FIG. 4, the MNO 24 of the main example implementation is depicted in system 300 as having a digital cellular voice and data station 304 having all of the conventional infrastructure and interconnections expected in such an installation including multiple cells or transmission and reception equipment for carrying out voice and data communication and routing. Interconnected therewith is one or more servers (programmed computers) 308 that is suitably interconnected with a user information knowledge 312 and a solution knowledgebase 48. MNO server 308 receives information such as GPS and other information from device 20 via the station 304 as well as potentially vehicle 30 (via device 20) and/or various sensors, from network content providers 32, local network affiliate broadcasters 40 and their advertisers 36 and 44 respectively. MNO server 308 further receives information from other data sources 66, such as the National Weather Service, MNO local business subscribers (which may be entered manually at the MNO), the Internet 56 and other information resources 52 (e.g., via the Internet). Server 308 identifies potentially useful information that can be cataloged in the user information knowledgebase 312 and in the solution knowledgebase 48. Both the user and the business can subscribe to the present services as pay services or either or both can be provided without charge.

An inference engine 320 is provided as either a separate computer or a program running on the MNO server computer or computers 308 in this example, or on other computers including computers in the mobile device 20 in other embodiments. In other implementations, the inference engine can be realized in the automobile 30, mobile device 20, or as a separate service accessed via the unicast connection 28 to the MNO 24. In the example discussed above, the inference engine 320 may utilize programmed production rules 324 and/or other mechanism to determine relationships between a user's current situation and information that can be potentially useful to the user and potentially provide revenue to business subscribers and the MNO 24.

In certain embodiments, content providers such as broadcasters, Internet based providers (Netflix, Hulu, etc.) cable companies or the like (any provider of content) can collect user information and provide the user with a better information resource and/or allow only more relevant information to be sent to any particular customer. The sending of this information can be made to be very relevant to a user's current situation with mobile phones or other mobile devices which have a suitable unicast connection. This connection being point to point allows very personal interaction with the content. It also allows the content provider to understand the user very well and what they are currently interested in and what information will be potentially m Thus, a method consistent with the present teachings involves at a mobile network operator site (MNO) receiving data from a mobile device representing a current situation of a user of the mobile device; at the MNO, storing data characterizing products and services represented in a MNO solution knowledgebase; at the MNO, storing data characterizing the user of the mobile device in a user knowledgebase; at an inference engine forming a part of the MNO, analyzing the data from the mobile device and the data characterizing the user in order to determine if the data corresponds to an actionable event relevant to the user; if the data corresponds to an actionable event relevant to the user, conducting a search of information relevant to the event and the mobile device data at least in the MNO solution knowledgebase; and pushing at least a portion of the search results from the MNO to the mobile device.

In certain implementations, the method further involves at the MNO, storing data received from multiple sources of information relevant to facilities, businesses and services available in the vicinity of the user, where the search is further conducted on the multiple sources of information. In certain implementations, the search further searches for incentives available to the user in the local MNO solution database, and further comprising the MNO pushing the incentives to the mobile device. In certain implementations, when an actionable event is identified, the MNO pushes an alert to the mobile device. In certain implementations, the MNO receives a signal from the mobile device as a result of user input in order to authorize a push of the search results from the MNO to the mobile device. In certain implementations, the search further searches for local businesses associated with local network affiliate broadcasters, and further comprising the MNO pushing data relating to the local businesses to the mobile device. In certain implementations, the search further searches for local businesses associated with network content providers. In certain implementations, the inference engine analyzes the mobile device location and the data characterizing the user by use of production rules. In certain implementations, the data from the mobile device is obtained from a sensor.

Another method consistent with these teachings involves receiving data representing a current situation of a user of a mobile device; at a mobile network operator (MNO), storing data characterizing products and services in a solution knowledgebase; storing data characterizing the user of the mobile device in a user knowledgebase; at a situational analysis engine, analyzing the data representing the mobile device user's current situation and the data characterizing the user in order to determine if the data corresponds to an actionable event relevant to the user; if the data corresponds to an actionable event relevant to the user, conducting a search of information relevant to the event and the current situation of the user at least in the solution knowledgebase; and providing at least a portion of the search results to the user.

In certain implementations, the method further involves storing data received from multiple sources of information relevant to facilities, businesses and services available in the vicinity of the user, where the search is further conducted on the multiple sources of information. In certain implementations, the search further searches for incentives available to the user in the solutions database, and further comprising providing the incentives to the user. In certain implementations, the inference engine analyzes the data representing the user's current situation and the data characterizing the user by use of production rules.

A mobile network operator (MNO) consistent with these teachings has a unicast transmission receiver configured to receive data from a mobile device representing a current situation of a user of the mobile device. A solution knowledgebase is configured to store data characterizing products and services. A user knowledgebase is configured to store data characterizing the user of the mobile device in a user knowledgebase. A situational analysis engine is programmed to analyze the data from the mobile device and the data characterizing the user in order to determine if the data corresponds to an actionable event relevant to the user. A programmed processor is programmed to conduct a search of information relevant to the event and the data received from the mobile device representing the current situation of the user at least in the solution knowledgebase, if the data corresponds to an actionable event relevant to the user. A transmitter is configured to push at least a portion of the search results from the MNO to the mobile device.

In certain implementations, the search further searches for incentives available to the user in the solution knowledgebase, and where the processor is configured to push the incentives from the MNO to the mobile device. In certain implementations, when an actionable event is identified, the processor is configured to push an alert from the MNO to the mobile device. In certain implementations, the MNO receiver is configured to receive a signal from the mobile device as a result of user input in order to authorize a push of the search results from the MNO to the mobile device. In certain implementations, the data from the mobile device comprises sensor data.

Another mobile device consistent with these teachings has a unicast transmitter configured to collect data representing a current situation of a user of the mobile device. A unicast receiver is configured to receive data from a mobile network operator (MNO). A situational analysis engine is programmed to analyze the data representing the current situation of the user by use of a solution knowledgebase configured to store data characterizing products and services and a user knowledgebase configured to store data characterizing the user of the mobile device. The data characterizing the user is analyzed by the situational analysis engine in order to determine if the data corresponds to an actionable event relevant to the user. A programmed processor is programmed to conduct a search of information relevant to the event and the data received from the mobile device representing the current situation of the user at least in the solution knowledgebase, if the data corresponds to an actionable event relevant to the user. The processor is programmed to provide at least a portion of the search results to the user.

In certain implementations, the search further searches for incentives available to the user in the solution knowledgebase, and the processor is programmed to provide the incentives to the user. In certain implementations, when an actionable event is identified, the processor is configured to alert the user. In certain implementations, the data from the mobile device comprises sensor data. In certain implementations, the sensor data comprises at least one of medical sensor data and automobile electronic sensor data.

Another method involves an MNO receiving data from a mobile device representing a current situation of a user of the device. Data characterizing products and services is stored in a solution knowledgebase. Data characterizing the user is stored in a user knowledgebase. An inference engine or situational analysis engine analyzes the data in order to determine if the data corresponds to an actionable event relevant to the user. If so, a search of information relevant to the event and the mobile device data at least in the solution knowledgebase is conducted and the results are pushed to the mobile device.

A system consistent with the present discussion has a mobile network operator (MNO) that provides mobile telephones with mobile telephone services and geographically localized information. The geographically localized information may be supplied to the MNO from a variety of sources. The mobile telephone has GPS global positioning capabilities. The telephone provides GPS data and other collateral data which may include data received from a vehicle including remaining fuel, tire pressure, anti-sleep alarms, emergency flasher status, heart rate monitor or other medical device, etc., that is relayed to the MNO inference engine relating to activities of and the environment surrounding, the mobile telephone user to the MNO. The MNO provides this collateral data including the GPS data along with the other data relating to activities of the mobile telephone user, and his immediate environment, to a situationally aware engine that correlates a deduced situation to resources and information within a geographic area containing the mobile telephone. The situationally aware engine pushes the selected geographically localized information to the mobile telephone.

Those skilled in the art will recognize, upon consideration of the above teachings, that certain of the above exemplary embodiments are based upon use of one or more programmed processors such as MNO server 308 which may host the inference engine 320 in certain implementations. However, the invention is not limited to such exemplary embodiments, since other embodiments could be implemented using hardware component equivalents such as special purpose hardware and/or dedicated processors that are situated with the MNO or are otherwise provided within device 20 or otherwise accessible to device 20. Similarly, general purpose computers, microprocessor based computers, micro-controllers, optical computers, analog computers, dedicated processors, application specific circuits and/or dedicated hard wired logic may be used to construct alternative equivalent embodiments.

Certain example embodiments described herein, are or may be implemented using a programmed processor executing programming instructions that are broadly described above in flow chart form that can be stored on any suitable electronic or computer readable non-transitory storage medium (such as, for example, disc storage, Read Only Memory (ROM) devices, Random Access Memory (RAM) devices, network memory devices, optical storage elements, magnetic storage elements, magneto-optical storage elements, flash memory, core memory and/or other equivalent volatile and non-volatile storage technologies), where the term "non-transitory" is intended to exclude propagating signals. However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or certain operations can be deleted or rearranged without departing from certain example embodiments of the invention. Error trapping can be added and/or enhanced and variations can be made in user interface and information presentation without departing from certain example embodiments of the present invention. Such variations are contemplated and considered equivalent.

While certain illustrative embodiments have been described, it is evident that many alternatives, modifications, permutations and variations will become apparent to those skilled in the art in light of the foregoing description.

What is claimed is:

1. A mobile network operator (MNO), comprising:
   a receiver configured to receive location data from a mobile device representing a current situation of a user of the mobile device;
   a solution knowledgebase configured to store data characterizing products and services;
   a situational analysis engine to analyze the location data from the mobile device to determine whether the data from the mobile device corresponds to an actionable event relevant to the user;
   a processor programmed with instructions to conduct a search of information relevant to the actionable event;
   the processor programmed with instructions to:
   determine, using the location data, whether the mobile device has been continuously traveling for a threshold period at a speed indicating confinement without a stop;
   responsive to determining that the mobile device has been continuously traveling for the threshold period at a speed indicating confinement without a stop, providing on the mobile device at least one alert of an existence of an actionable event.

2. The MNO according to claim 1, where the search further searches for incentives available to the user, and where the processor is configured to push the incentives from the MNO to the mobile device.

3. The MNO according to claim 1, where when an actionable event is identified the processor is configured to push an alert from the MNO to the mobile device.

4. The MNO according to claim 3, where the MNO receiver is configured to receive a signal from the mobile device as a result of user input in order to authorize a push of search results from the MNO to the mobile device.

5. The MNO according to claim 3, where the data from the mobile device comprises sensor data.

6. A method comprising:
   receiving location data from a mobile device;
   accessing information related to products and services;
   analyzing the location data from the mobile device to determine whether data from the mobile device corresponds to an actionable event relevant to a user;
   searching information relevant to the actionable event;
   determining, using the location data, whether the mobile device has been continuously traveling for a threshold period at a speed indicating confinement without a stop; and
   responsive to determining that the mobile device has been continuously traveling for the threshold period at a speed indicating confinement without a stop, providing on the mobile device at least one alert of an existence of an actionable event.

7. The method of claim 6, comprising searching for incentives available to the user, and pushing the incentives to the mobile device.

8. The method of claim 6, wherein responsive to identifying an actionable event, the method comprises pushing an alert to the mobile device.

9. The method of claim 6, comprising receiving a signal from the mobile device as a result of user input to authorize a push of search results to the mobile device.

10. The method according to claim 6, wherein the data from the mobile device comprises sensor data.

11. At least one computer memory that is not a transitory signal and that comprises instructions executable by at least one processor for:
   receiving location data from a mobile device;
   accessing information related to products and services;
   analyzing the location data from the mobile device to determine whether data from the mobile device corresponds to an actionable event relevant to a user;
   searching information relevant to the actionable event;
   determining, using the location data, whether the mobile device has been continuously traveling for a threshold period at a speed indicating confinement without a stop; and
   responsive to determining that the mobile device has been continuously traveling for the threshold period at a speed indicating confinement without a stop, providing on the mobile device at least one alert of an existence of an actionable event.

12. The computer memory of claim 11, wherein the instructions are executable for searching for incentives available to the user, and pushing the incentives to the mobile device.

13. The computer memory of claim 11, wherein the instructions are executable for, responsive to identifying an actionable event, pushing an alert to the mobile device.

14. The computer memory of claim 11, wherein the instructions are executable for receiving a signal from the mobile device as a result of user input to authorize a push of search results to the mobile device.

15. The computer memory of claim 11, wherein the data from the mobile device comprises sensor data.

* * * * *